Figure 1:
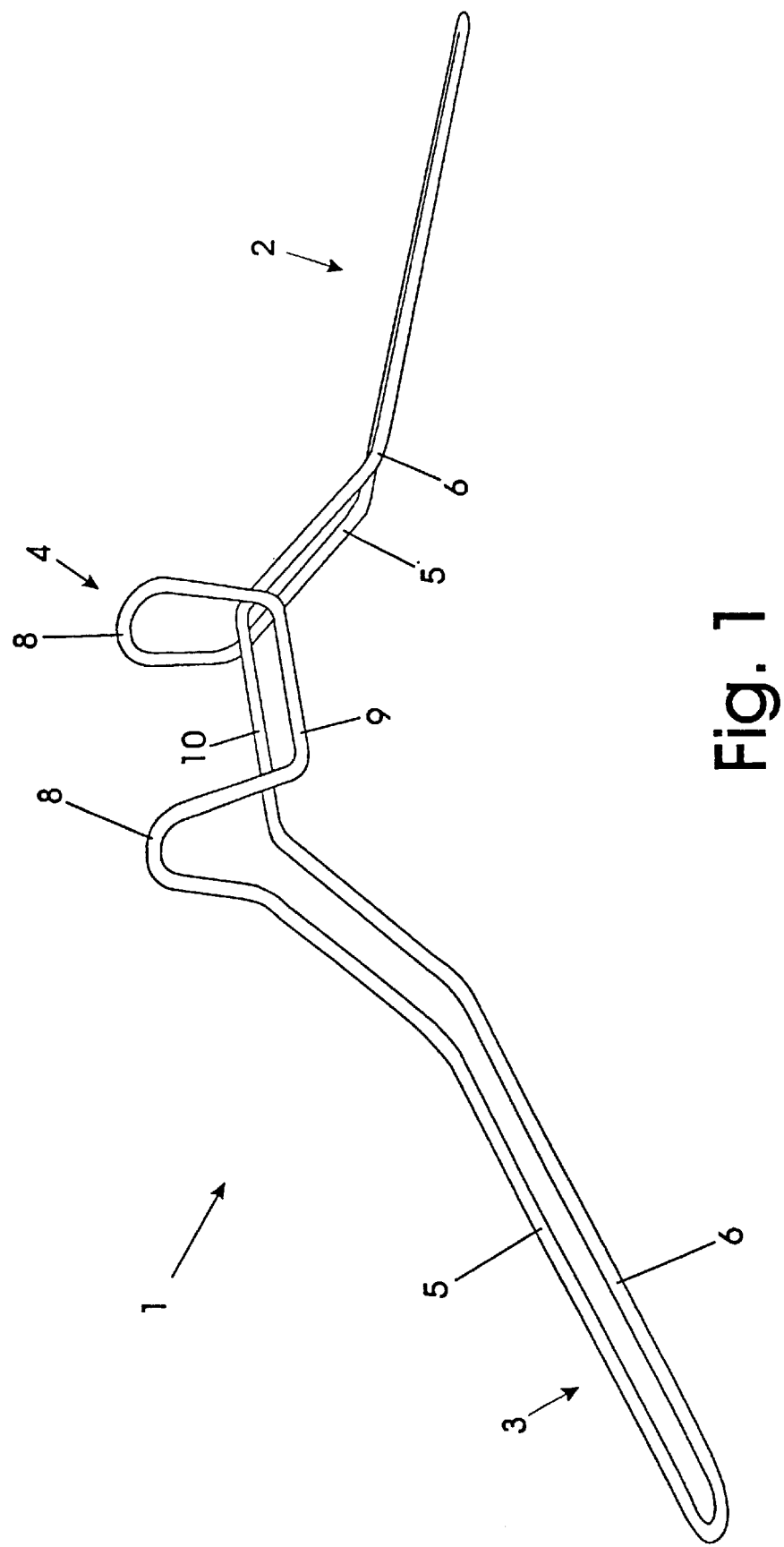

United States Patent [19]
Barlow et al.

[11] Patent Number: 5,904,278
[45] Date of Patent: May 18, 1999

[54] CLOTHES HANGER, IN PARTICULAR FOR HANGING ARTICLES OF CLOTHING FROM THE GRAB HANDLES INSIDE PASSENGER CARS

[75] Inventors: Christopher Paul Barlow, Ingolstadt; Karlhans Krönauer, Ilmmünster; Josef Aigner, Gosselthausen, all of Germany

[73] Assignee: MAWA Metallwarenfabrik Wagner GmbH, Pfaffenhofen/ILM, Germany

[21] Appl. No.: 08/945,813

[22] PCT Filed: May 15, 1996

[86] PCT No.: PCT/EP96/02075

§ 371 Date: Oct. 29, 1997

§ 102(e) Date: Oct. 29, 1997

[87] PCT Pub. No.: WO96/36262

PCT Pub. Date: Nov. 21, 1996

[30] Foreign Application Priority Data

May 18, 1995 [DE] Germany ................. 295 08 276 U
Dec. 5, 1995 [DE] Germany ................. 295 19 287 U

[51] Int. Cl.[6] ........................... A47G 25/42; A47G 25/32
[52] U.S. Cl. ........................ 223/85; 223/DIG. 4; 223/92
[58] Field of Search ..................... 223/85, 92, DIG. 1, 223/DIG. 4; D6/315

[56] References Cited

U.S. PATENT DOCUMENTS

| D. 29,872 | 12/1898 | Kennedy | 223/92 |
|---|---|---|---|
| D. 32,595 | 4/1900 | Rosentreter | 223/92 |
| 254,451 | 3/1882 | Bisbee | 223/DIG. 4 |
| 717,147 | 12/1902 | Walter | 223/85 |
| 2,046,654 | 7/1936 | Rosen | |
| 2,151,964 | 3/1939 | Gay | 223/DIG. 4 |
| 2,483,618 | 10/1949 | Brill et al. | |
| 2,494,973 | 1/1950 | Vollmer et al. | |
| 2,782,968 | 2/1957 | White | 223/85 |
| 2,877,940 | 3/1959 | Pressler | |

FOREIGN PATENT DOCUMENTS

| 1400597 | 12/1965 | France . |
|---|---|---|
| 1870146 | 4/1963 | Germany . |
| 1876678 | 8/1963 | Germany . |
| 3801625 | 8/1989 | Germany . |
| 1155816 | 6/1969 | United Kingdom . |
| 2283716 | 5/1995 | United Kingdom . |

*Primary Examiner*—Bibhu Mohanty
*Attorney, Agent, or Firm*—Hoffman & Baron, LLP

[57] ABSTRACT

The clothes hanger has a hanger member (1) with two carrier arms (2, 3), plus a suspension hook (4) between the carrier arms (2, 3), and a flexible securing element (10) which is located in the opening of the suspension hook (4) so that it reduces the opening of the suspension hook (4) and which can be displaced against a spring force so that it frees the opening of the suspension hook (4). The two carrier arms (2, 3) are each formed of first (5) and second (6) wire pieces running parallel to each other at a distance, the outer ends of the wire pieces (5, 6) being connected to each other, and the suspension hook (4) being disposed at the inner ends of the respective first wire piece (5). The flexible securing element (10) is formed by a further wire piece which connects the inner ends of the respective second wire pieces (6) to each other. The clothes hanger is suitable in particular for hanging articles of clothing from the grab handles inside a passenger car.

9 Claims, 5 Drawing Sheets

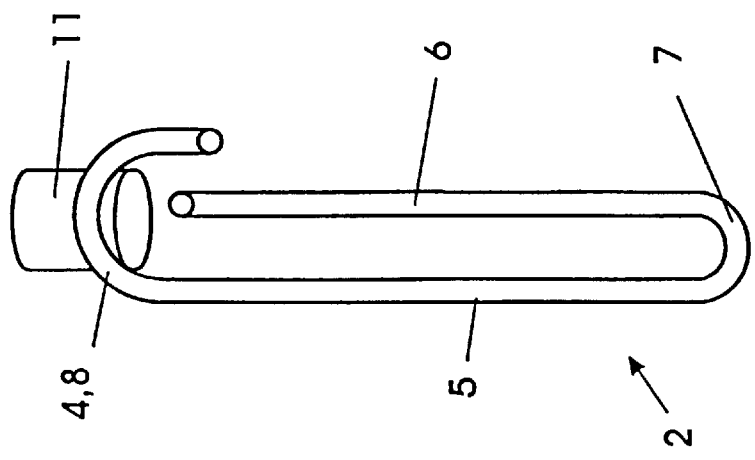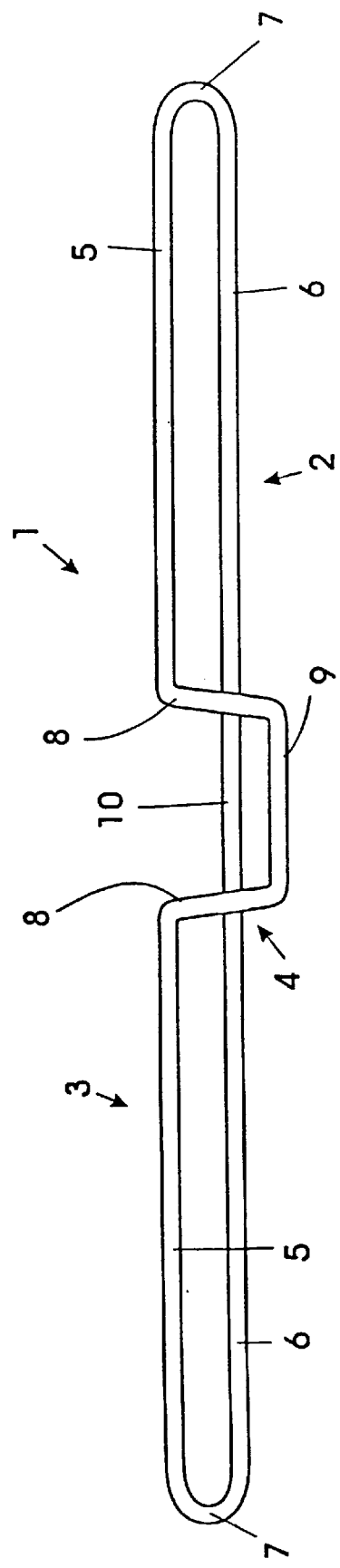

CLOTHES HANGER, IN PARTICULAR FOR HANGING ARTICLES OF CLOTHING FROM THE GRAB HANDLES INSIDE PASSENGER CARS

The invention relates to a clothes hanger which is suitable in particular for hanging articles of clothing from the grab handles inside a passenger car. The clothes hanger has a hanger member with two carrier arms, plus a suspension hook which projects upwards in the centre of the hanger member, and a flexible securing element which is located in the opening of the suspension hook so that it reduces the opening of the suspension hook and which can be displaced against a spring force so that it frees the opening of the suspension hook.

In order to have a possibility in a passenger car to hang an article of clothing, e.g. a jacket, on a clothes hanger, it is known to provide special coat hooks on the grab handles present inside the passenger car, from which grab handles the suspension hook of the clothes hanger can be hung. On occasions, the suspension hook of the clothes hanger is also itself hung on the grab handle. In every case the suspension is punctiform, with the result that when the passenger car accelerates and brakes the article of clothing swings and slides to and fro on the hanger member. There is also the danger that the clothes hanger will become detached from the grab handle if the vehicle shakes as a result of uneven stretches of road. If the jacket is hung directly from the coat hook by means of the sewn-in loop, this adversely affects the fit of the jacket.

Clothes hangers in which the suspension hooks are fitted with a securing element as in the case of a karabiner are known from FR-PS 1.400.597 and U.S. Pat. No. 2,483,618.

A suspension hook for clothes hangers which consists of two single hooks laterally spaced apart from each other but connected to each other is known from DE-GM 1 870 146. In this way, the article of clothing is to be secured against rotary, longitudinal and transverse movements, in particular when the clothes hanger is used in vehicles. The outline shape of the single hooks is a square standing on a diagonal with an open side, so that the suspension hook rests on the clothes rail at four points.

A suspension hook comprising two single hooks laterally spaced apart from each other but connected to each other is also known from U.S. Pat. No. 2,494,973. A two-point suspension is achieved through this suspension hook.

The object of the invention is to create a clothes hanger which sits securely at the grab handle inside the passenger car during the journey. The handling of the clothes hanger is to be particularly simple.

According to the invention, this object is achieved in that the two carrier arms each consist of first and second wire pieces running parallel to each other at a distance, the outer ends of the wire pieces being connected to each other, in that the suspension hook is disposed at the inner ends of the respective first wire piece and in that the flexible securing element is formed by a further wire piece which connects the inner ends of the respective second wire pieces to each other.

Because the flexible securing element can be displaced against a spring force, it resumes its original position after the clothes hanger has been suspended, in which position it closes the opening of the suspension hook again to the point where an unintentional detachment of the clothes hanger from the grab handle is prevented.

The suspension hook preferably has a width of ca. 6 cm or is a double hook consisting of two hook elements which run this distance apart. The two free ends of the hook elements are connected by a connection element. The effect of the particular width of the suspension hook is that the clothes hanger can still move only slightly on the grab handle in the longitudinal direction. Furthermore, the suspension hook thereby rests with its lateral edges or with the two hook elements on the grab handle, as a result of which the clothes hanger is largely prevented from swinging to and fro during the journey.

The to-and-fro swinging of the clothes hanger can be further reduced by fitting the suspension hook with a soft coating, e.g. an anti-slip coating such as is known for metal clothes hangers.

The clothes hanger is preferably bent from wire, the two carrier arms are each formed by two parallel running wire pieces which are connected to each other at their outer ends by a U-shaped bend, one of the two hook elements is formed at the inner ends of the respective one wire piece, the inner ends of the respective other wire piece are connected to each other by a further wire piece which represents the flexible securing element, and the hook elements and the flexible securing element are designed such that the flexible securing element is located inside the suspension hook. The clothes hanger can be formed from a wire loop closed upon itself which is bent from a single length of wire. The clothes hanger can also be welded together from two parts, e.g. by lap welding in the region of the U-shaped bends.

According to a particularly preferred version, the inner ends of the respective first and second wire piece of the two carrier arms are bent somewhat upwards and connected to each other by a straight wire piece to form a so-called collar zone, so that the two wire pieces run parallel to each other over their entire length. The suspension hook is formed separately. Because the two carrier arms are in this case connected to each other by the shortest route, this clothes hanger is particularly stable. The connection of the hanger member to the suspension hook takes place through two areally adjacent plates that are connected to each other, the collar zone of one wire piece being let into the one plate, while the securing ends of the suspension hook are let into the other plate. Both plates are then connected to each other by a positive fit, e.g. by a dovetail joint, or by welding or gluing.

Additionally, a downwardly projecting tie holder can also be let into one of the two plates.

Insert pieces can be fitted between the two parallel running wire pieces of each carrier arm at the lateral ends of each carrier arm. In order not to adversely affect the springing of the flexible securing element, the insert pieces are restricted to the lateral ends of the carrier arms. A horizontal trouser rail can be provided by means of these insert pieces, the lateral ends of the trouser rail being fixed in the insert pieces. The trouser rail can of course also be fixed to the lateral ends of the carrier arms in other ways, e.g. by welding.

To hang up and remove the clothes hanger, the latter is held by one of the carrier arms. In the process, the two parallel running wire pieces are necessarily pressed together. The flexible securing element which lies inside the suspension hook is thereby also displaced, so that the opening of the suspension hook lies open. If the suspension hook is hung from the grab handle and the carrier arm is released, the flexible securing element resumes its original position, in which it closes the opening of the suspension hook to the point where the clothes hanger cannot be detached from the grab handle.

The clothes hanger can be made of wood, plastics or metal and is expediently bent from an aluminium or steel wire 4 to 6 mm thick.

Figure 2:
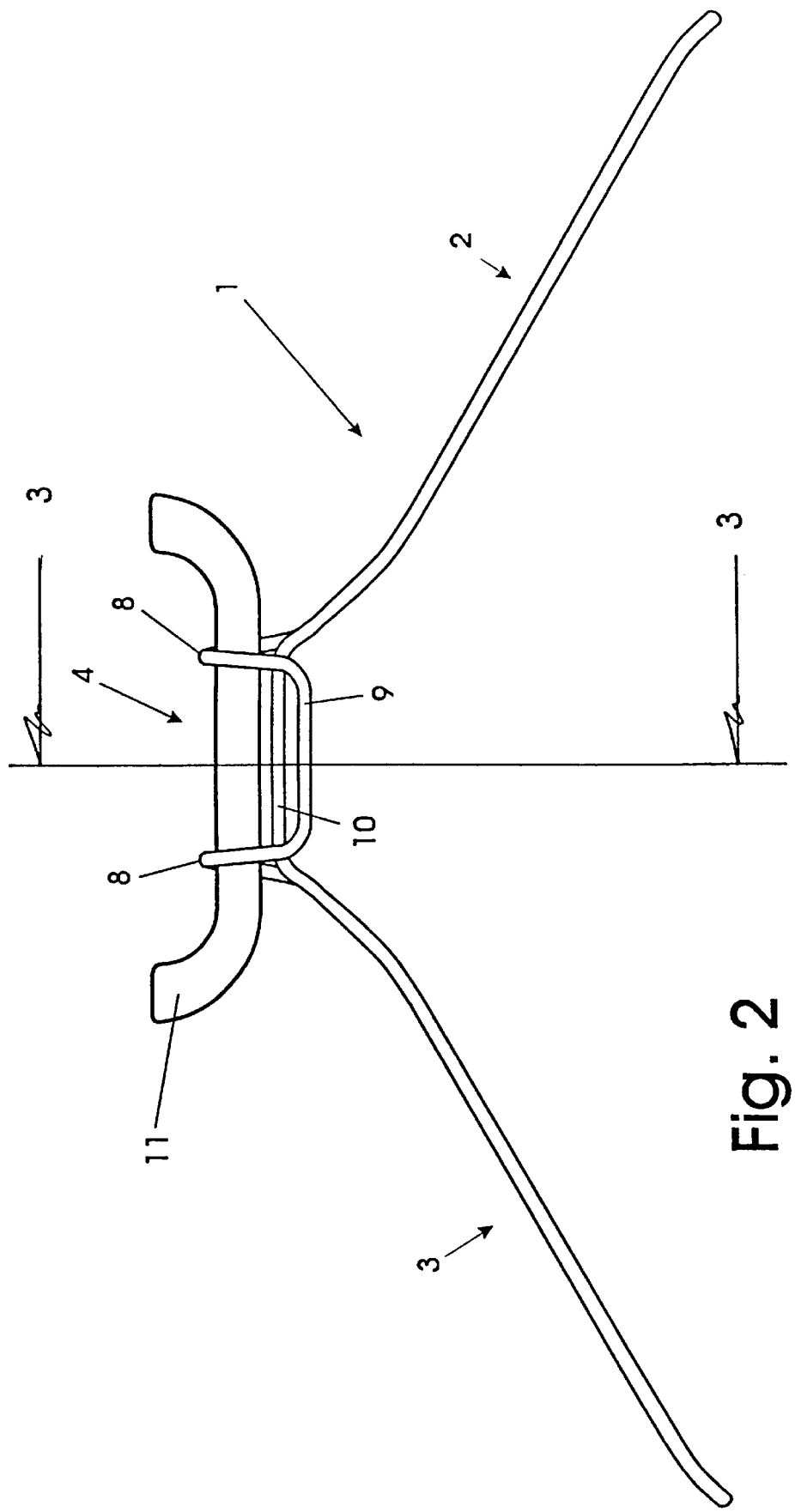
Figure 5:
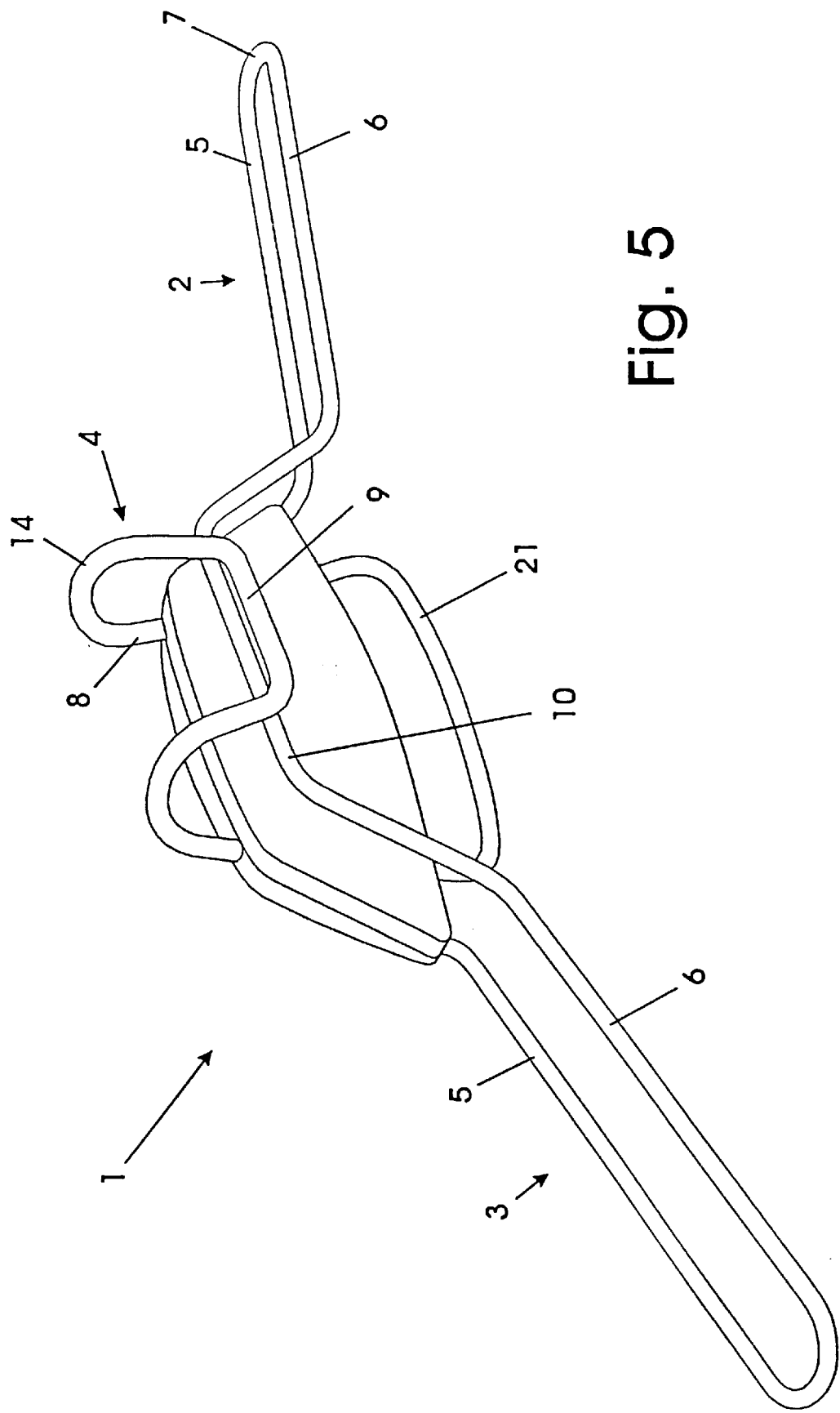

Embodiments of the invention are explained below with reference to the drawings. These show:

FIG. 1 a first embodiment of the clothes hanger in a view obliquely from above;

FIG. 2 the clothes hanger of FIG. 1, suspended from a grab handle from the front;

FIG. 3 a section along 3—3 of FIG. 2;

FIG. 4 the clothes hanger of FIG. 1 from above;

FIG. 5 a second embodiment of the clothes hanger and

Figure 6:
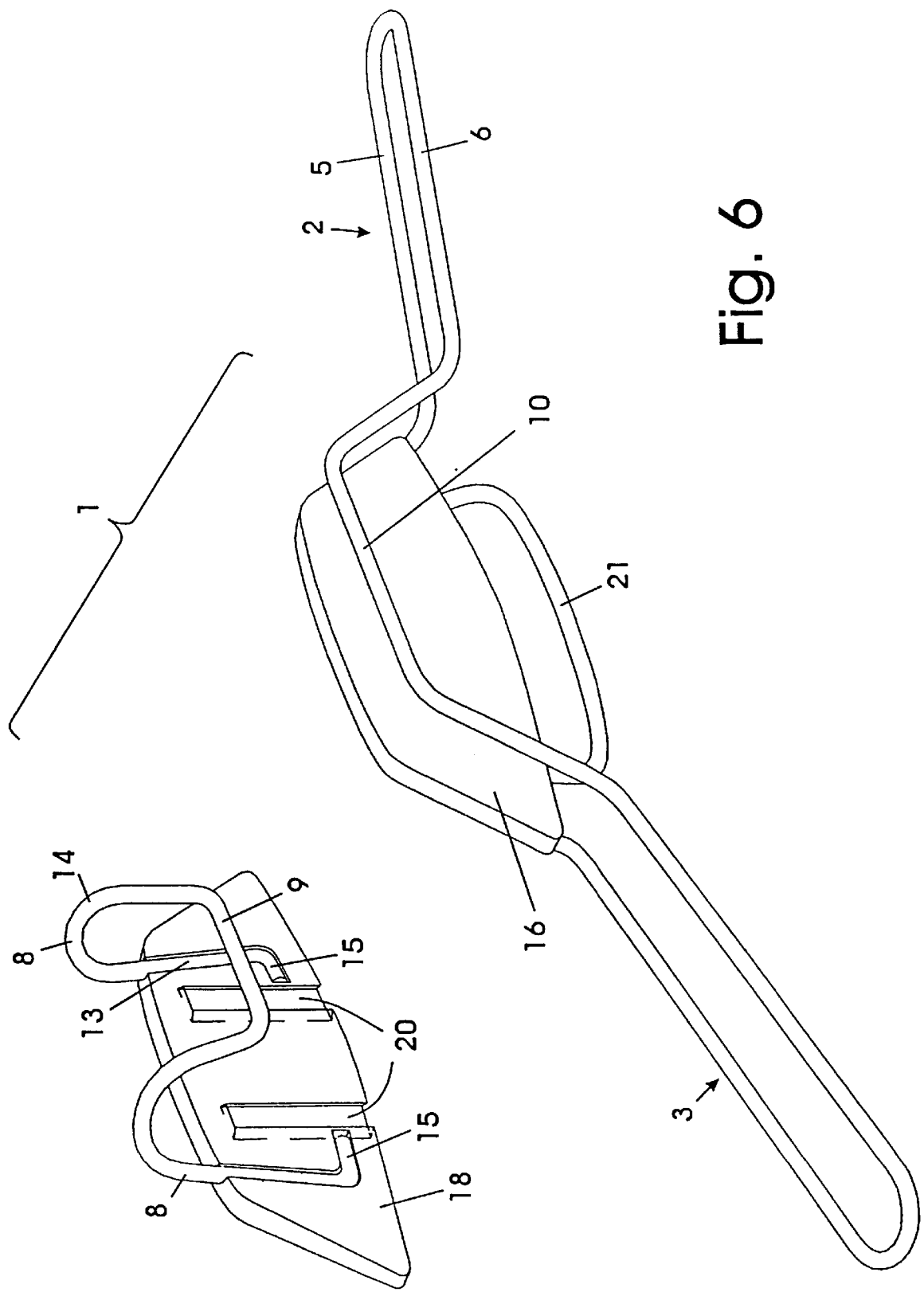

FIG. 6 the clothes hanger of FIG. 5 with the centre piece removed.

In the case of the embodiment of FIGS. 1 to 4, the clothes hanger is formed from a metal wire which describes a closed path. The clothes hanger has a hanger member 1 with two carrier arms 2, 3 plus a suspension hook 4.

The two carrier arms 2, 3 are formed by two first and second wire pieces 5, 6 which run parallel to each other at a distance of 1 to 2 cm and which are connected to each other at their outer ends by a U-shaped bend 7. As can be seen in FIG. 2, the carrier arms 2, 3 drop outwards and are bent, so that the angle of gradient to the inner end of the carrier arms 2, 3 becomes larger, as a result of which a collar zone is formed.

Attached in each case to the inner ends of the first wire pieces 5 are hook elements 8 which lie essentially in a plane which lies normal to the longitudinal extension of the hanger member 1 i.e. to the connection line of the two bends 7 at the outer ends of the carrier arms 2, 3. The free ends of the two hook elements 8 are connected to each other by a connection element 9 lying parallel to the longitudinal extension of the hanger member 1, so that the two hook elements 8 and the connection element 9 together form the suspension hook 4. The hook elements 8 run from the ends of the first wire pieces 5 initially upwards and then in a semicircular bend, so that the free ends of the hook-shaped elements 8 again point downwards. The semicircular bend is directed towards the second wire pieces 6 of the two carrier arms 2, 3.

The inner ends of the second wire pieces 6 are also connected to each other by a further wire piece 12. This further wire piece 12, in combination with the suspension hook 4, secures the clothes hanger against an unintentional detachment from the grab handle 11 and therefore forms a securing element 10.

As can be seen in particular from FIG. 3, the securing element 10 is located roughly in the middle of the area enclosed by the suspension hook 4 or is displaced somewhat towards the connection element 9, and the end of the suspension hook 4, i.e. the connection element 9, is pulled so far down that it lies lower than the securing element 10. It will also be seen from FIG. 3 that the clothes hanger cannot unintentionally become detached from the grab handle 11, since the securing element 10 comes up against the underside of the grab handle 11 after only a slight raising of the clothes hanger. Removal of the clothes hanger from the grab handle 11 is possible only if the two wire pieces 5, 6 of one of the two carrier arms 2, 3 are pressed against each other beforehand, something which more or less inevitably happens if one of the two carrier arms 2, 3 is gripped in the hand. After swivelling anti-clockwise, as seen in FIG. 3, by roughly 30° the clothes hanger can then be removed from the grab handle 11. The swivelling takes place in such a way that the suspension hook 4 points roughly into the inside of the car, while the bends 7 at the ends of the carrier arms 2, 3 point roughly towards the vehicle window.

To suspend the clothes hanger from the grab handle 11, the pattern of movements is reversed: the free end of the suspension hook 4, i.e. the connection element 9, is moved over the grab handle 11 in an alignment in which the clothes hanger points with its upper end, i.e. with the suspension hook 4, roughly at an angle of 30° into the inside of the car, and then pulled down-wards, the securing element 10 resuming its normal position when the carrier arm 2, 3 is released (FIG. 3).

There is a free zone between the points at which the hook elements 8 are angled away from the first wire pieces 5. This can be bridged by a leather or textile strip, and imprints, e.g. the make of car, can be applied to the leather or textile strip. A pocket can also be provided in the leather or textile strip, to accommodate a flat, collapsible clothes brush.

In the case of the embodiment of FIGS. 5 and 6, the clothes hanger is likewise formed from metal wire, but the hanger member 1 and the suspension hook 4 are made from separate wire elements.

The hanger member 1 again has two carrier arms 2, 3 which are formed by two first and second wire pieces 5, 6 which run parallel to each other at a distance of 1 to 2 cm and which are connected to each other at their outer ends by a bend 7. The angle of gradient of the two carrier arms 2, 3 is again greater in the collar zone. The inner ends of both wire pieces 5, 6 are connected to each other by wire pieces 12 which likewise run parallel to each other. Overall, the hanger member is thus formed from two parallel running wire elements.

The suspension hook 4 is again formed by two hook elements 8 and a connection element 9. Each hook element 8 has a straight shank 13, to the upper end of which a roughly semicircular hook zone 14 is attached. The lower ends 15 of the shanks 13 are angled towards each other.

The hanger member 1 and the suspension hook 4 are connected by being anchored in plastics plates 16, 18 which are connected to each other to form a middle piece. In FIG. 6 the two plates 16, 18 are shown prior to being joined. The two shanks 13 with the angled ends 15 are housed in grooves 19 in the plate 18. In a similar way, the more strongly angled inner ends of the first wire pieces 5 and the wire piece 12 connecting them are housed in a suitably shaped groove of the plate 16, this groove not being represented in FIG. 6. A tie hanger 21 can also project downwards from the plate 16. The two plates 16, 18 have the same measurements and have a roughly trapezoid shape which houses the whole collar zone of the one wire element. The two plates 16, 18 are joined together by means of a dovetail joint 20, so that the two plates 16, 18 in each case lie against each other with the side in which the grooves are located. Of the dovetail joint 20, only the trapezoidal grooves fitted in plate 18 are represented in FIG. 6, while the corresponding trapezoidal grooves are located on the side of the plate 16 that cannot be seen in FIG. 6.

The zones 14, bent roughly in the form of a semicircle, of the hook elements 8 are expediently provided with a soft, anti-slip plastics covering, whereby both a slippage on the grab handle 11 and a to-and-fro swinging are reduced.

If the clothes hanger is injection moulded from plastics or made from wood, the carrier arms can be made from solid material, each carrier arm being forked towards the inner end. The respective first and second prongs can then be connected to each other, and the suspension hook can be formed at the connection point of the first prongs, either as in the represented version in two hook elements spaced apart or in solid material of appropriate width. The connection piece of the respective second prongs then in turn forms the flexible securing element. Thanks to the forking of the carrier arms, an increase in the opening of the suspension hook is achieved when the carrier arm is gripped in the region of the forking to suspend or unhook the clothes hanger from the grab handle, in which case the two prongs are inevitably forced against each other.

We claim:

1. A clothes hanger, in particular for hanging articles of clothing from the grab handles inside a passenger car, having a hanger member (1) which has two carrier arms (2, 3), with a suspension hook (4) between the carrier arms (2, 3), and with a flexible securing element (10) which is located in the opening of the suspension hook (4) so that it reduces the opening of the suspension hook (4) and which can be displaced against a spring force so that it frees the opening of the suspension hook (4), characterized in that the two carrier arms (2, 3) each consist of first (5) and second (6) wire pieces running parallel to each other at a distance, the outer ends of the wire pieces (5, 6) being connected to each other, the suspension hook (4) is disposed at the inner ends of the respective first (5) wire piece and the flexible securing element (10) is formed by a further wire piece which connects the inner ends of the respective second wire pieces (6) to each other.

2. A clothes hanger, according to claim 1, characterized in that the suspension hook (8) has a width of approximately 6 cm.

3. A clothes hanger, according to claim 1, characterized in that the suspension hook (4) is designed as a double hook consisting of two hook elements (8), the free ends of which are connected by a connection element (9).

4. A clothes hanger according to claim 3, characterized in that the clothes hanger is bent from wire and one of the two hook elements (8) is formed at the inner ends of the respective first wire piece (5).

5. A clothes hanger according to claim 1, characterized in that the clothes hanger is bent from wire and the suspension hook (4, 8) and the inner ends of the first wire pieces (5) are held in a middle piece (16, 18).

6. A clothes hanger, according to claim 2, characterized in that the suspension hook (4) is designed as a double hook consisting of two hook elements (8), the free ends of which are connected by a connection element (9).

7. A clothes hanger, according to claim 2, further comprising a middle piece (16, 18), the clothes hanger characterized in that the clothes hanger is bent from wire and the suspension hook (4, 8) and the inner ends of the first wire pieces (5) are held in the middle piece (16, 18).

8. A clothes hanger, according to claim 3, further comprising a middle piece (16, 18), the clothes hanger characterized in that the clothes hanger is bent from wire and the suspension hook (4, 8) and the inner ends of the first wire pieces (5) are held in the middle piece (16, 18).

9. A clothes hanger, according to claim 6, further comprising a middle piece (16, 18), the clothes hanger characterized in that the clothes hanger is bent from wire and the suspension hook (4, 8) and the inner ends of the first wire pieces (5) are held in the middle piece (16, 18).

* * * * *